United States Patent
Punde

(10) Patent No.: US 10,829,327 B2
(45) Date of Patent: Nov. 10, 2020

(54) MODULE FOR TURNING OVER FOLDING PACKAGES AND FOLDING PACKAGE PRODUCTION LINE INCORPORATING SUCH A MODULE

(71) Applicant: BOBST MEX SA, Mex (CH)

(72) Inventor: Sushant Ashok Punde, Chinchwad Pune (IN)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 16/317,483

(22) PCT Filed: Jun. 20, 2017

(86) PCT No.: PCT/EP2017/025170
§ 371 (c)(1),
(2) Date: Jan. 11, 2019

(87) PCT Pub. No.: WO2018/007017
PCT Pub. Date: Jan. 11, 2018

(65) Prior Publication Data
US 2019/0210827 A1    Jul. 11, 2019

(30) Foreign Application Priority Data

Jul. 5, 2016  (IN) .............................. 201641023032

(51) Int. Cl.
*B65G 47/252*  (2006.01)
*B65H 15/02*  (2006.01)
(Continued)

(52) U.S. Cl.
CPC ........... *B65H 15/02* (2013.01); *B65G 47/252* (2013.01); *B65H 5/023* (2013.01); *B65H 29/12* (2013.01);
(Continued)

(58) Field of Classification Search
CPC .. B65H 29/20; B65H 2301/332; B65H 5/023; B65H 33/12; B65H 29/6663; B65H 29/12; B65H 2701/1766; B65G 47/252
(Continued)

(56) References Cited

U.S. PATENT DOCUMENTS 3,184,079 A * 5/1965 Dario Buccicone .........................
B65G 47/252
414/765
4,784,558 A * 11/1988 Toriyama ............... B65H 15/02
271/3.01
(Continued)

FOREIGN PATENT DOCUMENTS

CN    105 197 549 A    12/2015
EP    2 392 451 A2    12/2011
(Continued)

OTHER PUBLICATIONS

International Search Report in PCT/EP2017/025170, Sep. 21, 2017 (dated Oct. 2, 2017), 4 pages.
(Continued)

*Primary Examiner* — Lynn E Schwenning
(74) *Attorney, Agent, or Firm* — Bookoff McAndrews, PLLC

(57) ABSTRACT

The module (3) comprises a frame having vertical pillars (30A, 30B), a rotary turnover structure (4) arranged horizontally between the vertical pillars and comprising rotation shafts (400A) supported by bearings (300A) with which the vertical pillars are respectively equipped. A motor (303B) applies a first mechanical torque to one of the rotation shafts when a folding package turnover is ordered in the machine. The module also comprises additional means (5) for applying a second mechanical torque to the other rotation shaft upon a folding package turnover.

9 Claims, 5 Drawing Sheets

(51) Int. Cl.
    *B65H 33/12*     (2006.01)
    *B65H 29/66*     (2006.01)
    *B65H 29/12*     (2006.01)
    *B65H 5/02*     (2006.01)
    *B65H 29/20*     (2006.01)

(52) U.S. Cl.
    CPC ......... *B65H 29/20* (2013.01); *B65H 29/6663* (2013.01); *B65H 33/12* (2013.01); *B65H 2301/332* (2013.01); *B65H 2301/42112* (2013.01); *B65H 2402/10* (2013.01); *B65H 2403/944* (2013.01); *B65H 2404/25* (2013.01); *B65H 2404/2614* (2013.01); *B65H 2404/2615* (2013.01); *B65H 2404/2641* (2013.01); *B65H 2515/10* (2013.01); *B65H 2515/34* (2013.01); *B65H 2701/1766* (2013.01)

(58) Field of Classification Search
    USPC ....................................................... 414/758
    See application file for complete search history.

(56) References Cited

U.S. PATENT DOCUMENTS

| | | | | |
|---|---|---|---|---|
| 4,798,278 | A | * | 1/1989 | Cornacchia .......... B65G 47/252 198/399 |
| 6,142,287 | A | * | 11/2000 | Biffert ................. B65G 47/252 198/402 |
| 6,527,100 | B2 | * | 3/2003 | Ballestrazzi ........... B65H 15/00 198/373 |
| 8,684,657 | B2 | * | 4/2014 | Pini ..................... B65G 47/244 414/759 |
| 9,284,132 | B2 | * | 3/2016 | Hawighorst ......... B65G 47/252 |
| 9,828,189 | B2 | * | 11/2017 | Tillman .............. B65G 47/252 |
| 2014/0219766 | A1 | | 8/2014 | Hawighorst |

FOREIGN PATENT DOCUMENTS

| | | |
|---|---|---|
| EP | 2 762 426 A1 | 8/2014 |
| GB | 2 202 207 A | 9/1988 |
| JP | 05-008843 A | 1/1993 |
| JP | 05-046816 U | 6/1993 |
| JP | 2002-370818 A | 12/2002 |
| KR | 10-2013-0057457 A | 5/2013 |

OTHER PUBLICATIONS

Chinese First Office Action bothTranslated (10 pages) and Chinese (6 pages) copies issued from the State Intellectual Property Office of People's Republic of China in related Chinese Application No. 201780054136.

Korean Written Opinion both Translated (7 pages) and Korean (6 pages) copies issued from the Korean Intellectual Property Office in KR 10-2019-7003449.

* cited by examiner

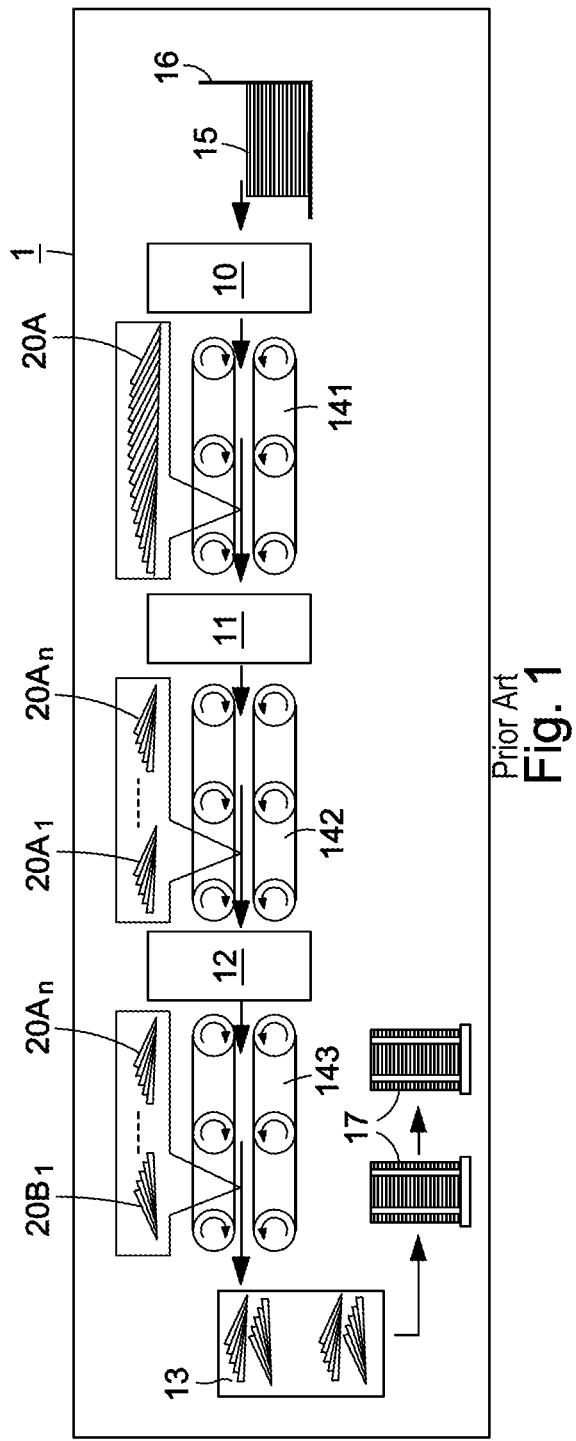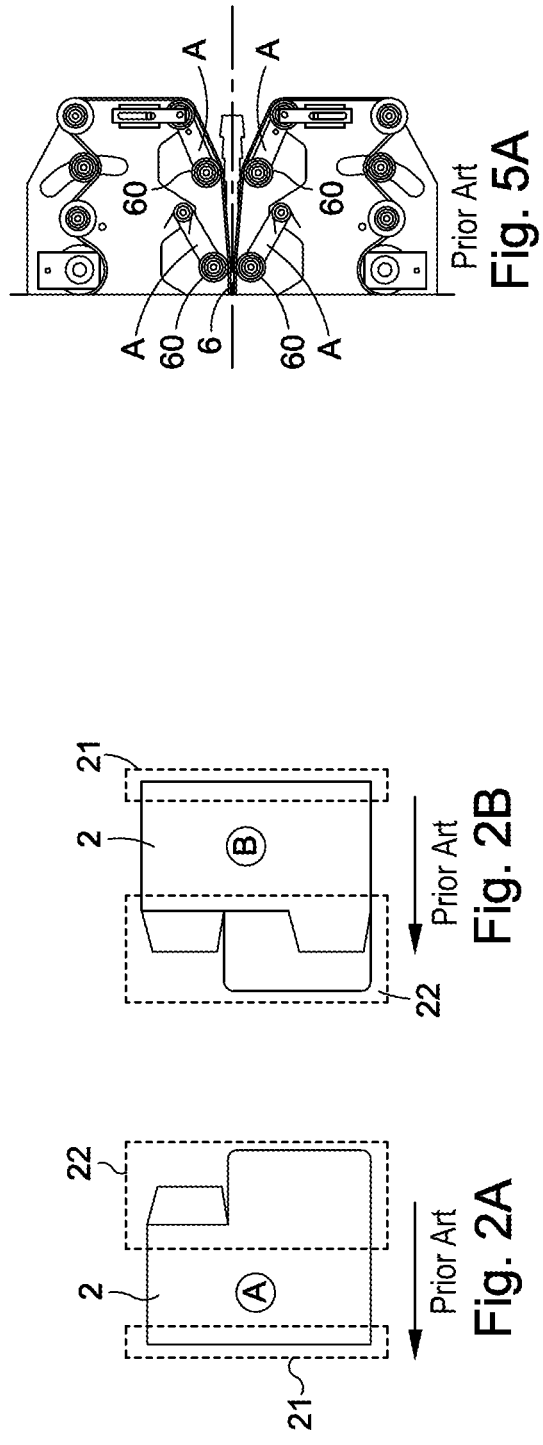

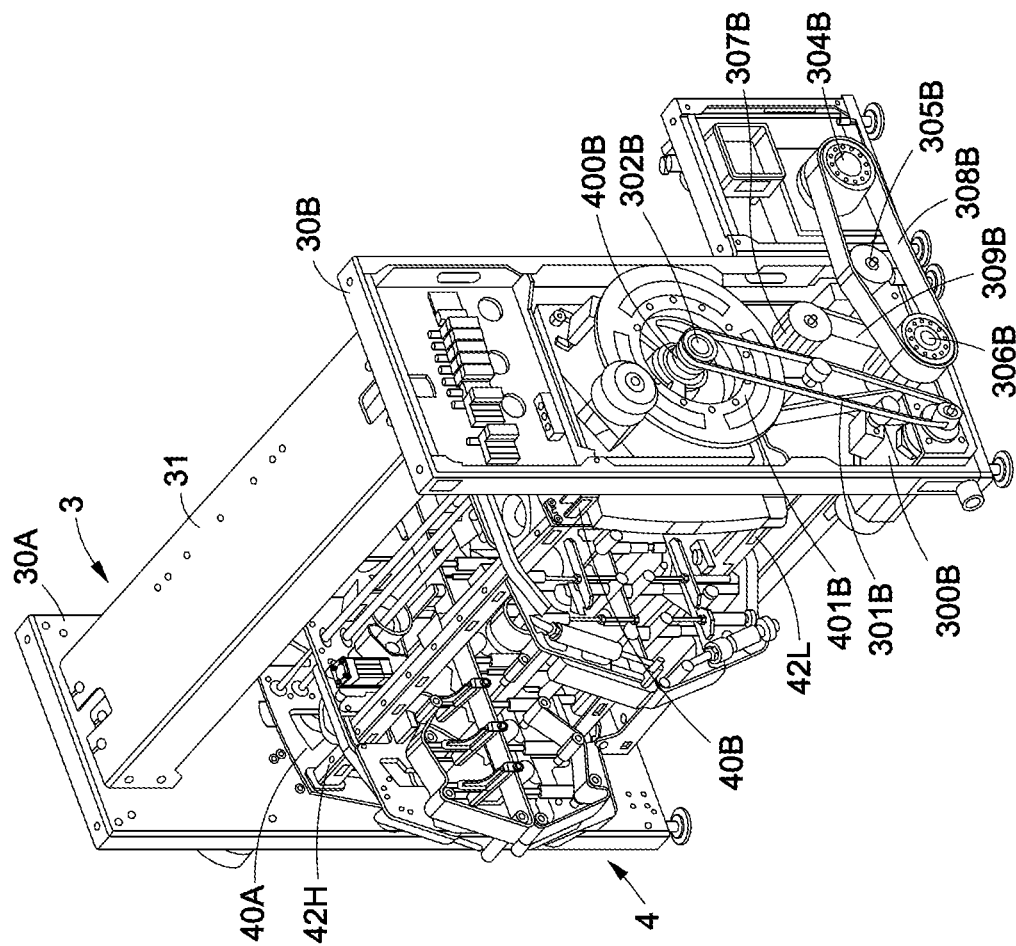
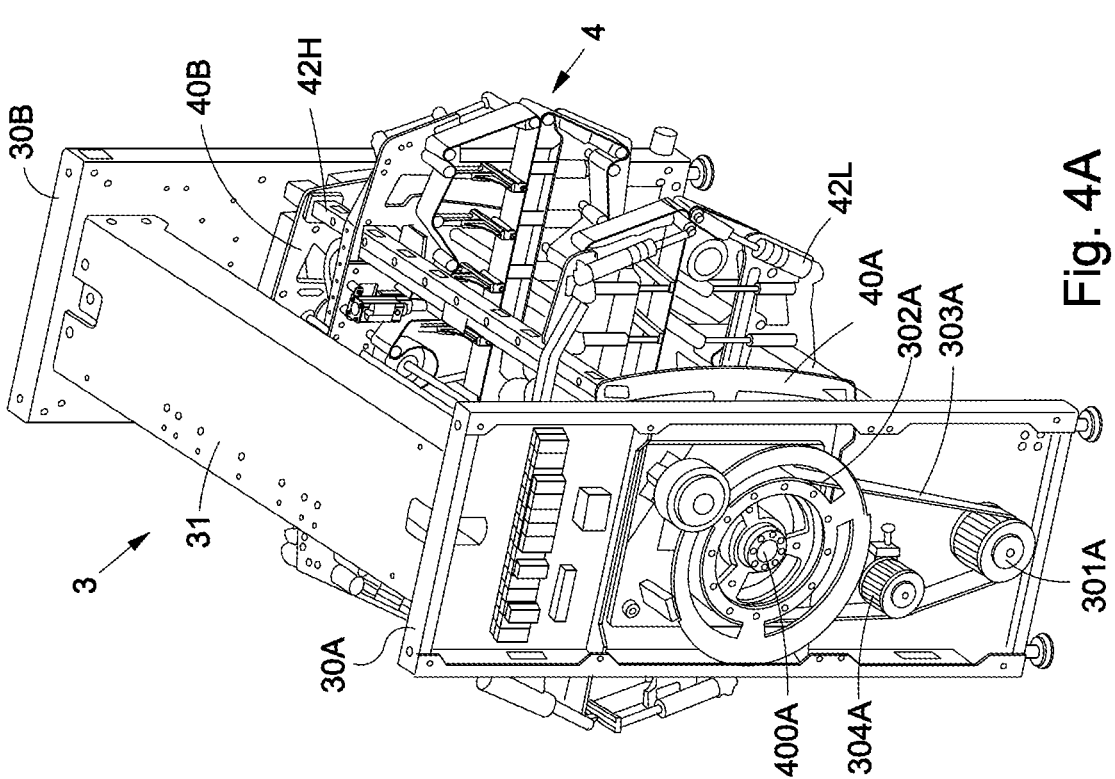

MODULE FOR TURNING OVER FOLDING PACKAGES AND FOLDING PACKAGE PRODUCTION LINE INCORPORATING SUCH A MODULE

CROSS-REFERENCE TO RELATED APPLICATION(S)

This application is a National Stage under 35 U.S.C. § 371 of International Application No. PCT/EP2017/025170, filed on Jun. 20, 2017, which claims priority to Indian Patent Application No. 201641023032, filed on Jul. 5, 2016, the contents of all of which are incorporated by reference in their entirety.

The present invention is applicable generally in the field of the packaging industry. More particularly, the invention relates to a module for turning over shingle streams of folding packaging such as shingle streams of folding boxes and a folding package production line in which such a turnover module is incorporated.

Referring to FIGS. 1, 2A and 2B, a general configuration of a folding box production line according to the prior art known to the inventive entity is described hereinbelow in a simplified manner. As shown in FIG. 1, a production line 1 of the prior art comprises a folding-gluing machine 10, a counting-segmentation module 11, a turnover module 12, a packing module 13 and motorized transport conveyors 141, 142 and 143.

At the inlet of the production line 1, blanks 15, for example of flat cardboard or corrugated cardboard, are stacked in a bin 16 which is regularly topped up. These blanks 15 are inserted and processed successively in the folding-gluing machine 10. The machine 10 performs folding and gluing operations so as to obtain a folding box in flat configuration such as the box 2 shown in FIG. 2A. The folding box 2 of FIG. 2A is shown in plan view according to the arrangement A.

The folding boxes 2 are delivered in a continuous stream at the outlet of the folding-gluing 10, in the form of a shingle stream 20A of folding boxes 2 in flat configuration. The arrangement of the boxes 2 in the continuous shingle stream 20A is the arrangement A shown in FIG. 2A. The arrow represented in FIG. 2A indicates the direction in which the boxes 2 are transported in the production line 1.

The continuous shingle stream 20A is transported by the motorized conveyor 141 to the counting-segmentation module 11. The conveyor 141, just like the conveyors 142 and 143, transports the folding boxes 2 into a pinching zone between two endless transport belts. As is known, these transport belts of the conveyors 141, 142 and 143 are supported by rollers and tensioned by means of tensioning devices.

In these folding box production lines, there is the problem of packing of the boxes in a container or the palletization thereof.

These folding boxes 2 generally have a non-uniform thickness. Thus, the part 21 of the folding box 2 shown in FIG. 2A here has a thickness very much greater than that of the part 22 of the box. It follows therefrom that the packing in a container directly from the continuous shingle stream 20A delivered by the conveyor 141 would lead irretrievably to a poor optimization of the filling of the packing container.

Palletization from the continuous shingle stream 20A cannot be considered, because the verticality of the stack of folding boxes 2 on the pallet cannot be assured. This defect of verticality introduces an instability and difficulties in binding the stack of boxes on the pallet.

One solution known from the prior art for solving the packing problem explained above involves two successive additional operations performed in the production line 1.

The first operation consists in breaking the continuity of the shingle stream 20A by segmenting it into different shingle stream portions $20A_1$ to $20A_n$, spaced apart from one another, as shown in FIG. 1. The shingle stream portions $20A_n$ are each formed by a certain number of folding boxes 2. This operation is performed by the counting-segmentation module 11. In FIG. 1, the folding boxes 2 at the outlet of the module 11 remain in the arrangement A of FIG. 2A.

The next additional operation consists in turning over one shingle stream portion in every two by 180 degrees. This operation is performed by the turnover module 12. The module delivers at its outlet a succession of shingle stream portions which are immediately stacked into bundles $20B_1$, $20A_2$, $20B_3$ ... $20A_n$, at the inlet of the transport conveyor 143, as shown in FIG. 1. The bundles $20B_n$ are the bundles turned over by 180 degrees and, due to the turning-over thereof, exhibits the arrangement B shown in FIG. 2B.

The flow of bundles delivered by the turnover module 12 is transported to the packing module 13. The turning-over of one shingle stream portion in every two makes it possible to compensate for the thickness difference between the parts 21 and 22 of the folding boxes 2. The packing module 13 is then able to ensure an optimal packing of the folding boxes 2. FIG. 1 shows here a packing in the form of palletized stacks 17 of folding boxes.

In such a folding box production line, the need to perform the two additional operations described above has a significant impact on the duration of the production process.

The second operation, that of turning over one packet in every two, is that of the two operations which proves to be the most critical for the manufacturers of the packaging, in terms of duration of the turnover operation, of risk of damage to the folding boxes and the costs of developing, adjusting and servicing the turnover module.

A turnover module from the prior art comprises a bridge frame supporting a rotary turnover structure, also called pivoting cradle, which is housed between two vertical pillars of the frame. These pillars rest on a factory floor and the turnover structure housed between them comprises two turnover conveyors. These two conveyors each comprise two transport belts mounted on rollers which define between them a pinching zone for driving the shingle stream portions of folding boxes in transit. The two conveyors have a similar architecture and are arranged facing, at a certain distance from one another, on two respective parallel vertical planes. Their respective pinching zones are situated in a same horizontal pinching plane which, when the turnover module is in idle position, that is to say, not running, is in alignment with the planes of the inlet 142 and output 143 conveyors of the production line. The turnover structure comprises a horizontal axis of rotation defined between the two vertical pillars. This axis of rotation passes through the pinching plane of the conveyors of the turnover structure and is at right angles to the vertical planes thereof and to the direction of transport of the shingle stream portions.

This turnover module from the prior art comprises two motors, a first motor for rotationally driving the turnover structure and a second motor for driving the transport belts of its conveyors.

The first motor rotationally drives the turnover structure through a mechanical coupling with a first structure rotation shaft. This first rotation shaft is aligned on the horizontal axis of rotation of the structure and is housed in a through bearing incorporated in one of the vertical pillars. A second structure rotation shaft, aligned on the horizontal axis of rotation thereof, is housed in another bearing incorporated in the other vertical pillar and receives no rotation torque.

The operation of this prior art module breaks down into a number of steps.

In a first step, with the turnover structure in idle position, that is to say not running and with its pinching plane in alignment with the plane of transport of the shingle stream portions at the inlet and at the output of the module, the incoming shingle stream portion is inserted into the pinching plane of the turnover structure. The insertion of the shingle stream portion into the pinching plane is ensured by the moving transport belts of the conveyors of the turnover structure. The inserted shingle stream portion is immediately discharged without being turned over by the still-moving belts of the conveyors of the turnover structure.

In a second step, the belts of the conveyors of the turnover structure are stopped and the inserted shingle stream portion remains immobilized in the pinching plane. The turnover structure then performs a rotation of 180 degrees and, once the latter has returned to an idle position, the belts of the conveyors are restarted and discharge the turned-over shingle stream portion from the turnover module.

These turnover modules are heavy devices. The turnover structure represents a significant weight, generally of the order of several hundreds of kilograms, and its inertia is commensurate. It follows therefrom that the torque applied to rotationally actuate the turnover structure at the rate of production can be very high. Given this significant rotation torque and the high inertia of the turnover structure, severe mechanical stresses are applied and flexural and torsional phenomena can occur and lead to the appearance of vibratory phenomena, or even mechanical resonances.

In the turnover module of the prior art described above, the presence of oscillations which occur when the turnover structure returns to an idle position are highlighted. These oscillations have the effect of imposing on the automatic control of the module a waiting time that is necessary for the damping thereof.

It follows therefrom that the duration of the turnover operation is prolonged by this waiting time and affects the overall duration of the process of production and of packing of the folding boxes. Moreover, these oscillations provoke vibrations throughout the module, vibrations liable to provoke premature wear of the parts, and in particular wear of the bearings supporting the rotation of the turnover structure. Such wear of the bearings can only emphasize the vibratory phenomena with the aging of the module.

SUMMARY OF THE INVENTION

The aim of the present invention is to provide solutions to the drawbacks explained above of the prior art by proposing a novel architecture for a turnover module which can be incorporated in a production line for folding packages such as folding boxes.

According to a first aspect, the present invention relates therefore to a module for turning over folding packages, such as folding boxes, that can be incorporated in a folding package production line and comprising a frame having first and second vertical pillars, a rotary turnover structure arranged horizontally between the vertical pillars, and comprising first and second rotation shafts supported by first and second bearings with which the first and second vertical pillars are respectively equipped, and a motor for applying a first mechanical torque to the first rotation shaft when a folding package turnover is ordered in the module.

According to the invention, the module comprises additional means for applying a second mechanical torque to the second rotation shaft upon a folding package turnover.

According to a particular embodiment of the invention, the additional means comprise a transmission shaft coupled mechanically in rotation to the motor and applying the second mechanical torque to the second rotation shaft, the sum of the first and second mechanical torques corresponding to a total mechanical torque supplied by the motor.

According to a particular feature, the module comprises a first pulley and a first distribution belt for mechanically coupling in rotation the transmission shaft to the motor.

According to another particular feature, the module comprises a second pulley and a second distribution belt for mechanically coupling in rotation the transmission shaft to the second rotation shaft.

According to yet another particular feature, the motor and the additional means simultaneously apply the first and second mechanical torques to the first and second rotation shafts.

According to yet another particular embodiment of the invention, the rotary turnover structure comprises at least one double-belt conveyor arranged vertically and comprising a horizontal pinching zone in an intermediate zone for transporting and holding the folding packages between the facing high and low belts of the conveyor.

According to yet another particular embodiment of the invention, the rotary turnover structure comprises two double-belt conveyors arranged vertically and means for adjusting distance between two respective vertical planes of the double-belt conveyors.

According to yet another particular embodiment of the invention, a double-belt conveyor comprises first and second sets of rollers mounted on dedicated jacks arranged vertically and distributed over a length of transport of the double-belt conveyor, the first set of rollers guiding a low belt of the conveyor and the second set of rollers guiding a high belt of the conveyor.

According to a particular feature, adjustable and different pressures are applied to the high and low belts by the dedicated vertical jacks, the pressure applied to the low belt supporting the weight of the folding packages being greater than the pressure applied to the high belt.

According to another aspect, the invention relates also to a folding package production line comprising a folding-gluing machine, a counting-segmentation module, a turnover module and a set of conveyors, in which the turnover module is a module for turning over folding packages as described briefly above.

BRIEF DESCRIPTION OF THE DRAWINGS

Other advantages and features of the present invention will emerge more clearly on reading the following description of a number of particular embodiments with reference to the attached drawings, in which:

FIG. 1 shows, in simplified form, a folding box production line of the prior art;

FIGS. 2A and 2B show a plan view of the folding boxes of the prior art in flat configuration in normal and turned-over arrangements;

FIGS. 4A and 4B are front and rear perspective views of the turnover module of FIG. 3;

FIG. 5A shows, in simplified form, the architecture of a double-belt conveyor of the prior art;

EXEMPLARY EMBODIMENTS OF THE INVENTION

Figure 3:
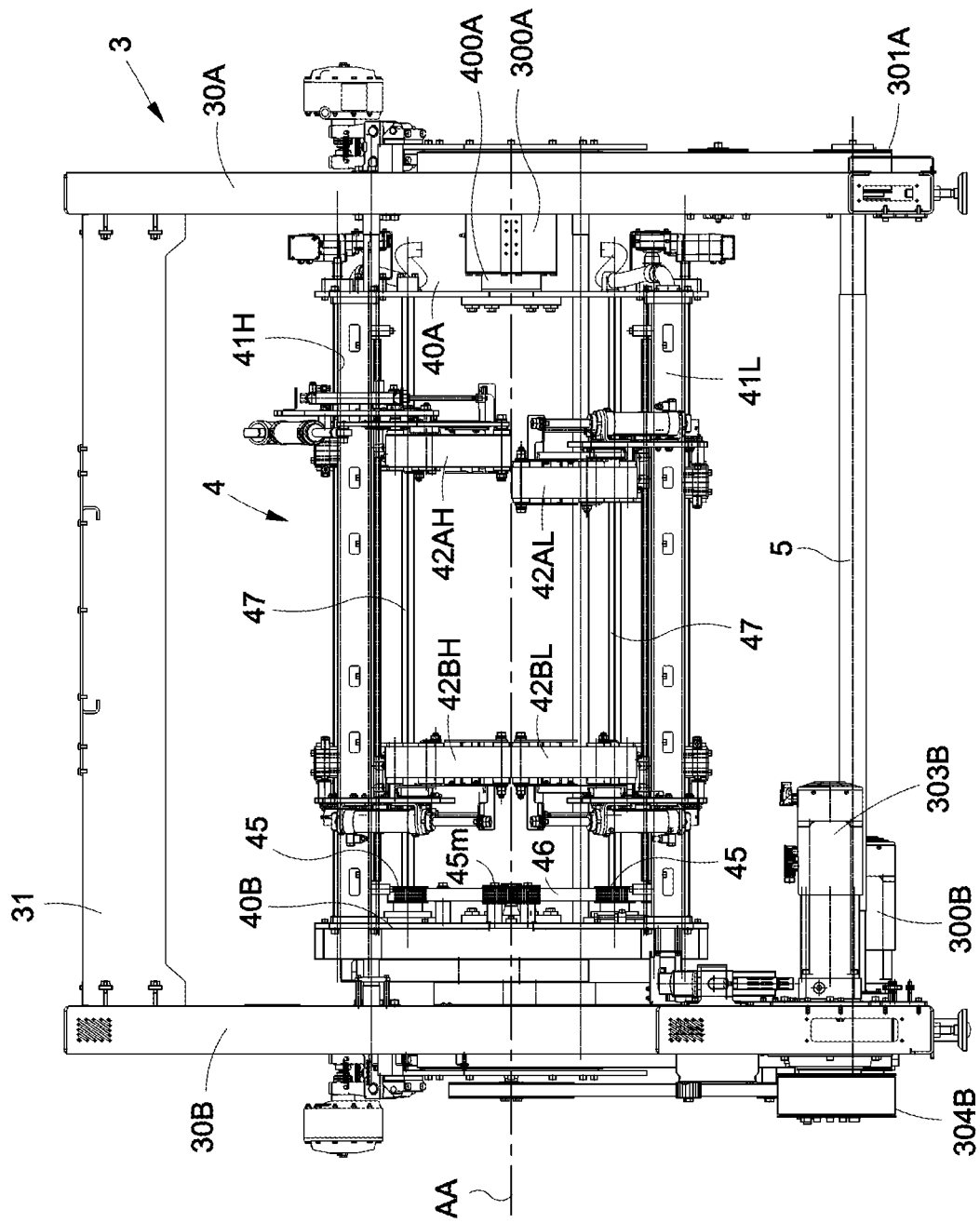
FIG. 3 is a front view of a turnover module according to a particular embodiment of the invention.

Referring mainly to FIGS. 3, 4A and 4B, the general architecture of a particular embodiment of a turnover module according to the invention is first of all described hereinbelow.

The turnover module 3 mainly comprises a bridge frame formed by a front pillar 30A, a rear pillar 30B and a transverse high beam 31, and a turnover structure 4.

The front 30A and rear 30B pillars are arranged vertically and are joined mechanically in their high parts to the ends of the horizontally arranged transverse high beam 31. The pillars 30A, 30B comprise low parts forming level-adjustable supporting bases that can rest on a factory floor. The duly formed bridge frame is leveled in a conventional manner.

The turnover structure 4 is mounted horizontally between the two pillars 30A and 30B. The structure 4 comprises front 40A and rear 40B cradle plates arranged in parallel vertical planes and joined by means of four transverse bars 41H, 41L and 42H, 42L mounted horizontally. The bars 41H, 41L, 42H, 42L are fixed at their ends to fixing flanges (not represented) of the cradle plates 40A, 40B. These flanges are positioned in a rectangle on the cradle plates 40A, 40B.

The cradle plates 40A, 40B comprise, in central parts, respective rotation shafts 400A, 400B. These rotation shafts 400A, 400B are inserted into through bearings with which the front and rear pillars 30A, 30B are respectively equipped. The through bearing receiving the shaft 400A can be seen in FIG. 3 and is referenced 300A.

The rotation shafts 400A, 400B and the corresponding bearings (300A) are aligned on the horizontal axis of rotation AA, shown in FIG. 3, of the module 3. The axis of rotation AA is at right angles to the front and rear pillars 30A, 30B, is contained in the pinching plane of the folding boxes inside the turnover structure 4 and is at right angles to the direction of transport of the folding boxes entering into the turnover module 3 or leaving therefrom.

Figure 5:
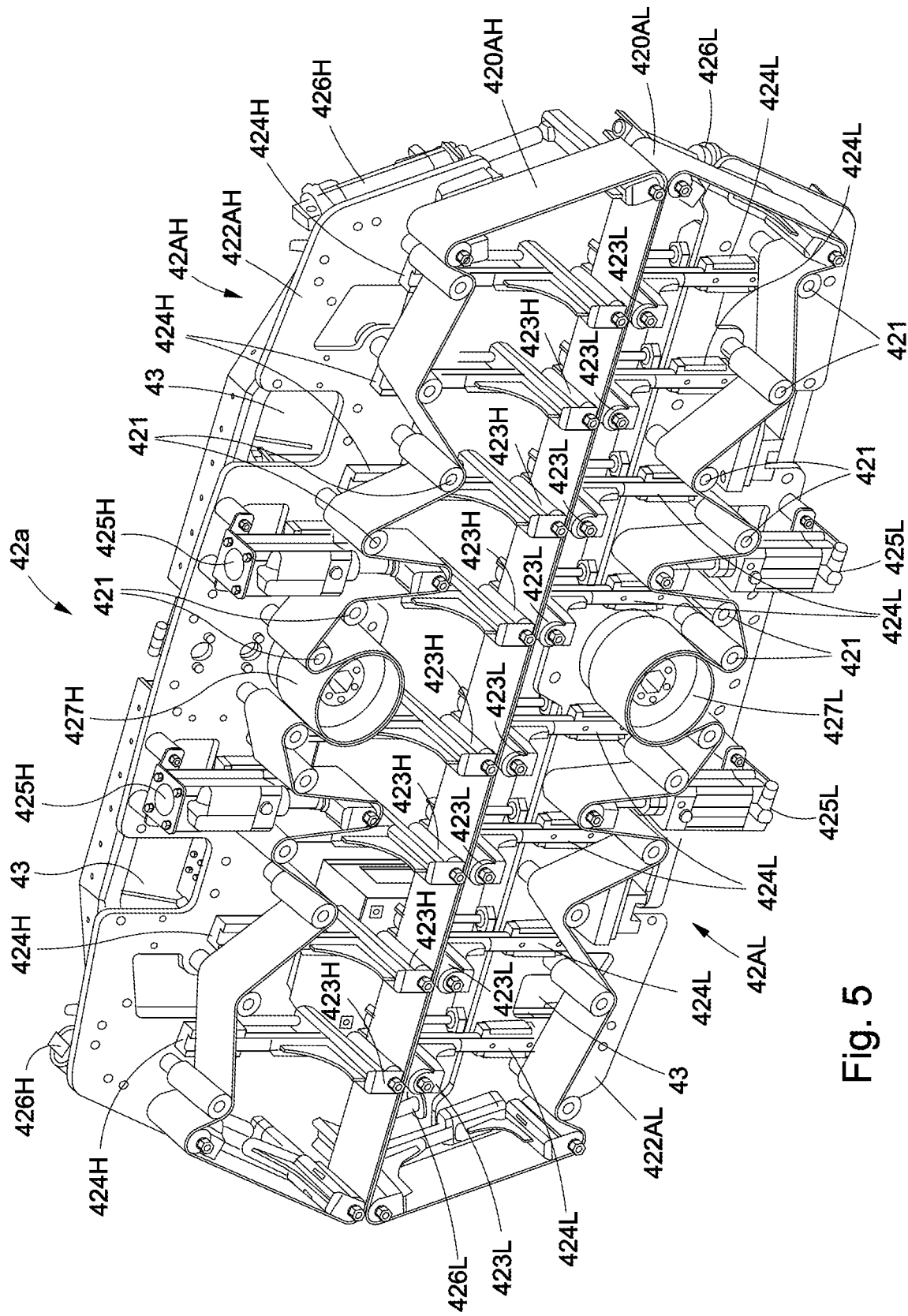
FIG. 5 is a perspective view of a double-belt conveyor contained in a turnover structure of the module of FIG. 3.

Referring also to FIG. 5, two double conveyors 42A and 42B are now described, each simply designated by the terms "double conveyor" hereinbelow, which are mounted in the turnover structure 4.

In other embodiments of the invention, the proposed combination of two conveyors 42A, 42B can be replaced by a single conveyor having extra-wide transport belts.

The double conveyors 42A and 42B each comprise two single-belt conveyors 42AH, 42AL and 42BH, 42BL, each designated by the terms "conveyor subassembly" hereinbelow. The conveyor subassemblies 42AH and 42BH are mounted in the high part of the turnover structure 4 and are supported by the parallel high transverse bars 41H and 42H. The conveyor subassemblies 42AL and 42BL are mounted in the low part of the turnover structure 4 and are supported by the parallel low transverse bars 41L and 42L.

As shown in FIG. 5 for the conveyor 42A, the conveyor subassemblies 42AH and 42AL comprise voids 43 for the insertion thereof into the transverse bars 41H, 42H and 41L, 42L, respectively, and the individual sliding thereof on the latter, conveyor subassembly 42B with a configuration similar to that of the conveyor subassembly 42A.

The sliding of the conveyor subassemblies onto the transverse bars of the cradle allows their separation to be adjusted in order to configure the module for different folding box dimensions, for example, or according to parameters linked to the operation of the production line.

A staggered vertical alignment between the conveyors 42AH and 42AL can be seen in FIG. 3. In this FIG. 3, it is a representation during adjustment to show here the possibility that exists in the turnover module according to the invention of individually slidingly positioning each of the conveyor subassemblies 42AH, 42AL, 42BH, 42BL on their respective transverse bars. Once the positioning adjustment operation is finished, the conveyor subassemblies 42AH, 42AL (42BH, 42BL) forming the conveyor 42A (42B) are immobilized on the transverse bars and are aligned in a same vertical plane.

As clearly emerges in FIG. 5 for the conveyor 42A, each conveyor subassembly 42AH, 42AL comprises an endless transport belt 420AH, 420AL, respectively.

Each conveyor 42AH, 42AL comprises a first set of loose rollers 421 mounted on shafts fixed to a plate 422AH, 422AL, and ensuring the guiding of the belts 420AH, 420AL, respectively.

Each conveyor subassembly 42AH, 42AL also comprises a second set of loose rollers 423H, 423L supported by a set of dedicated jacks 424H, 424L fixed to the plates 422AH, 422AL, respectively. In this embodiment of the invention, eight high jacks 424H and eight low jacks 424L are provided. Obviously, the numbers thereof will depend on the different possible applications of the turnover module according to the invention.

According to the invention, the axes of the jacks 424H, 424L are vertical and therefore control vertical movements of the sets of loose rollers 423H, 423L. This feature of vertical arrangement of the jacks 424H, 424L greatly facilitates the control of the pinching zone between the facing belts 420AH and 420AL. It is thus possible to control the separation between the belts according to the thickness of the shingle stream portions of folding boxes to be processed, by a simple adjustment of the air pressure applied to the jacks. Furthermore, very advantageously, the flatness of the transport plane in the pinching zone, ensured by the lower belt 420AL (in the position of the conveyor subassemblies of FIG. 5), can be guaranteed by applying a greater pressure, adjustable on the low jacks 424L, when an increased weight of the shingle stream portions of folding boxes in transit for example has to be supported. The pressure applied to the high jacks 424H, according to the invention, will be able to be lower than that applied to the low jacks 424L. In effect, the upper belt 420AH (still in the position of the conveyor subassemblies of FIG. 5) does not have to support the weight of the shingle stream portions of folding boxes in transit and the pressure of the high jacks 424H can be minimized to ensure sufficient securing of the shingle stream portions of folding boxes without risking damage to the surface of the boxes and an increase in scrap. Obviously, according to the invention, the values of the pressures applied to the jacks 424H and 424L will be able to be switched over according to the position of the turnover structure 4, since the latter is required to perform rotations of 180 degrees. It will thus be possible to retain, in different positions of the turnover structure 4, the differentiation described above between the pressures applied to the shingle stream portions by the transport belt situated in the low position and that situated in the high position.

As can be seen also in FIG. 5, each conveyor subassembly 42AH, 42AL further comprises two vertical jacks 425H, 425L and jacks 426H, 426L mounted with tilt, respectively. These jacks are fixed onto the plates 422AH and 422AL and bear loose rollers in contact with endless transport belts 420AH, 420AL. Their function is to tension the transport belts. The vertical jacks 425H, 425L guarantee a sufficiently significant tension of the belts 420AH, 420AL on either side of a belt-driving drum 427H, 427L provided in the conveyor subassemblies 42AH, 42AL, respectively. The jacks 426H, 426L mounted with tilt ensure a suitable pinching at the ends of the pinching zone between the facing belts 420H, 420L.

The mechanical architecture described above for the conveyors 42A, 42B and proposed in the present invention adds an optimization of the transfer and of the holding of the shingle stream portions of folding boxes in the turnover structure of the module, an optimization which helps to significantly reduce scrap from the folding boxes.

The conveyors incorporated in the turnover structure known from the inventive entity have an architecture of the type of that shown in FIG. 5A. In this architecture of FIG. 5A, the rollers 60 provided for the guiding and holding of the shingle stream portions of folding boxes in the pinching zone 6 are borne by shafts A inclined relative to the vertical. Such a inclination of the shafts A bearing the rollers 60 does not allow a differentiated and optimal control of the pressures on the high and low belts of the conveyor, as is proposed in the present invention. Furthermore, the inclination of the shafts A is not identical over the entire length of transport ensured by the conveyor of FIG. 5A. In effect, this inclination of the shafts A is reversed on the symmetrical part, not represented, of the conveyor of FIG. 5A. Consequently, while it may be considered that the adjustment of this inclination of the shafts A is suitable for obtaining and guaranteeing a certain quality for the transport of the shingle stream portions in the conveyor, such an adjustment may be suitable only over a half of the length of transport ensured by the conveyor.

The rotational driving of the belts of the conveyors 42A, 42B is now described in detail hereinbelow with reference more particularly to FIGS. 4B, 3, 5 and 6.

Figure 6:
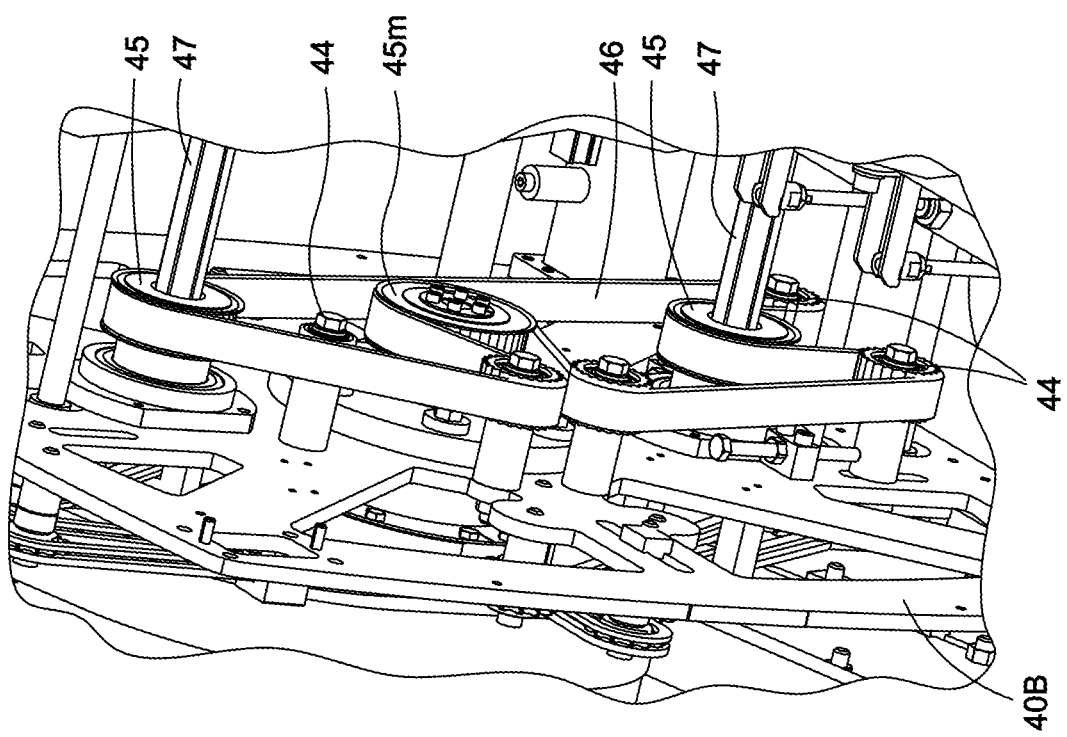
FIG. 6 is a partial perspective view showing a rotational driving mechanism for conveyors incorporated in the module of FIG. 3.

As emerges clearly in FIG. 6, the turnover structure 4 is equipped with a mechanism for driving the belts which is fixed onto the front cradle plate 40B and comprises loose toothed pulleys 44, three driving toothed pulleys 45, 45m and a distribution belt 46. The mechanism is actuated by the motive driving pulley 45m (visible also in FIG. 3). The loose pulleys 44 help to guide and tension the distribution belt 46. The two pulleys 45 (also visible in FIG. 3) are driven in rotation by the driving pulley 45m and the belt 46 and communicate their rotational movements to two transmission rods 47, here of hexagonal section, which are inserted and fixed mechanically in hubs of the pulleys 45 (see FIG. 6).

As shown more particularly in FIG. 3, these two rods 47 are prolonged transversely over the length of the turnover structure 4 and are coupled mechanically with the belt-driving drums 427H and 427L of the conveyors 42BH, 42AH and 42BL, 42AL by insertion through hubs with hexagonal bore with which the drums 427H and 427L are equipped (see FIG. 5).

Figure 7:
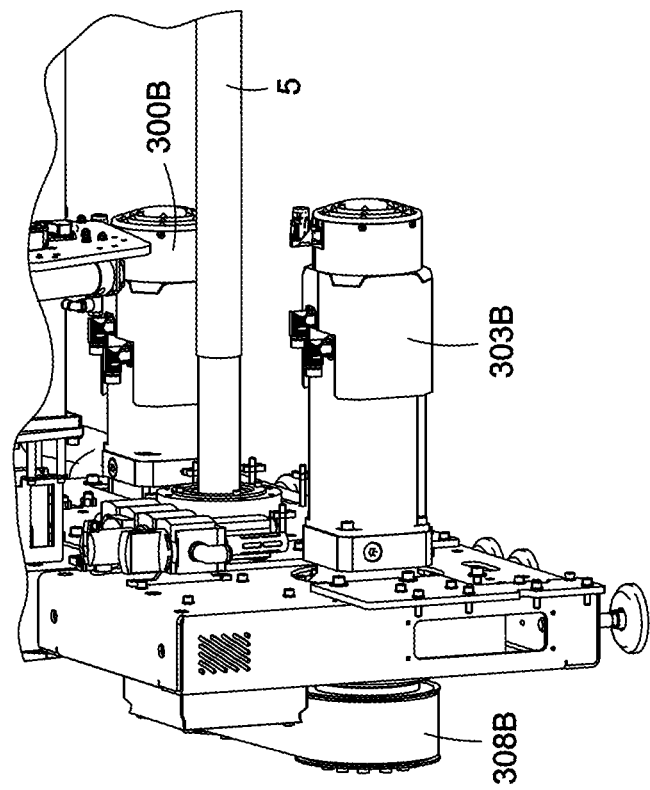
FIG. 7 is a partial perspective view showing motors and a torque transmission shaft incorporated in the module of FIG. 3.

The drive pulley 45m is actuated in rotation by a motor 300B shown in FIGS. 4B and 7. As shown in FIG. 4B, the rotational movement of the motor 300B is transmitted by a distribution belt 301B to a pulley 302B fixed onto the same rotary axial shaft as the drive pulley 45m.

The rotational driving of the turnover structure 4 is now described in detail hereinbelow with reference more particularly to FIGS. 3, 4A, 4B and 7.

According to the invention, the turnover structure 4 is driven in rotation from its two rotation shafts 400A, 400B housed in respective bearings (see 300A in FIG. 3) with which the pillars 30A, 30B are respectively equipped. First and second mechanical torques are applied simultaneously to the shafts 400A and 400B, respectively, and provoke the rotation of the turnover structure 4.

The motor dedicated to the rotational actuation of the turnover structure 4 is shown in FIGS. 3 and 7 and is referenced 303B. The motor 303B drives a driving toothed pulley 304B, visible in FIGS. 3 and 4B, in rotation. A mechanical driving mechanism comprising toothed pulleys 305B, 306B, 307B and first and second distribution belts 308B, 309B is provided between the drive pulley 304B and the rotation shaft 400B which is equipped with a flywheel 401B. The first distribution belt 308B transmits the drive torque supplied by the drive pulley 304B to the toothed pulley 306B. The second distribution belt 309B is mounted on the same toothed pulley 306B as the first distribution belt 308B, alongside the latter, and on another toothed pulley 307B and a flywheel 401B fixed to the rotation shaft 400B. A first part of the rotation torque supplied by the motor 303B is thus applied to the rotation shaft 400B of the turnover structure 4.

The toothed pulley 306B participates in the transmission of a second part of the rotation torque supplied by the motor 303B to the rotation shaft 400A of the turnover structure 4.

As shown in FIGS. 3 and 7, a transmission shaft 5 is provided, the function of which is to transmit the second part of the torque supplied by the motor 303B to a toothed pulley 301A (see FIG. 4A) which is mounted in the low part of the pillar 30A.

The transmission shaft 5 is mechanically fixed at its two ends onto respective hubs of the toothed pulleys 305B and 301A and transmits the second part of the torque supplied by the motor 303B to the toothed pulley 301A.

As shown in FIG. 4A, the rotation shaft 400A of the turnover structure 4 is equipped with a flywheel 302A around which is mounted a distribution belt 303A. The distribution belt 303A is mounted also on the toothed pulley 301A which supplies the second part of the drive torque transmitted via the transmission shaft 5. A loose toothed pulley 304A, adjustable in position, is also provided to ensure a suitable tensioning of the distribution belt 303A. The second part of the torque supplied by the motor 303B is applied by the means described above to the shaft 400A of the turnover structure 4 and participates in the rotational driving thereof.

Obviously, the invention is not limited to the particular embodiment which has been described here by way of example. Different variant embodiments will be able to be produced by those skilled in the art depending on the applications concerned.

The turnover module according to the invention is described here in a particular embodiment which uses only a single motor supplying all the rotation torque to the turnover structure, this torque being distributed over the two rotation shafts of the turnover structure using distribution means comprising the transmission shaft 5. Obviously, another embodiment could provide two synchronously controlled motors, each of them being dedicated to driving a rotation shaft of the turnover structure.

The invention claimed is:

1. A module for turning over folding packages that can be incorporated in a folding package production line, comprising:
   a frame having first and second vertical pillars; and
   a rotary turnover structure arranged horizontally between the vertical pillars, the rotary turnover structure comprising:
   first and second rotation shafts supported by first and second bearings with which the first and second vertical pillars are respectively equipped;
   a first motor for applying a first mechanical torque to the first rotation shaft;
   additional means for applying a second mechanical torque to the second rotation shaft;
   at least one double-belt conveyor arranged vertically and comprising a horizontal pinching plane in an intermediate zone, the at least one double-belt conveyor being configured to transport and hold the folding packages between high and low belts of the at least one double-belt conveyor; and
   a mechanism for driving the high and low belts,
   wherein the mechanism for driving the high and low belts is actuated by a motive driving pulley, actuated in rotation by a second motor,
   the mechanism includes pulleys and transmission rods,
   the motive driving pulley transmits the rotation to the pulleys,
   the pulleys transmit the rotation to the transmission rods,
   the transmission rods extend horizontally along the rotary turnover structure in a direction from the first vertical pillar to the second vertical pillar, and
   the transmission rods transmit the rotation to belt driving drums of the at least one double-belt conveyor for each of the high and low belts.

2. The module of claim 1, wherein the additional means comprise a transmission shaft coupled mechanically in rotation to the first motor and applying the second mechanical torque to the second rotation shaft, a sum of the first mechanical torque and the second mechanical torque corresponding to a total mechanical torque supplied by the first motor.

3. The module of claim 2, wherein the additional means further comprises a first pulley and a first distribution belt for mechanically coupling in rotation the transmission shaft to the first motor.

4. The module of claim 2, wherein the additional means further comprises a second pulley and a second distribution belt for mechanically coupling in rotation the transmission shaft to the second rotation shaft.

5. The module of claim 1, wherein the first motor and the additional means simultaneously apply the first mechanical torque and the second mechanical torque to the first rotation shaft and the second rotation shaft.

6. The module of claim 1, wherein the at least one double-belt conveyor is one of two double-belt conveyors, the two double-belt conveyors being arranged vertically, and the rotary turnover structure further comprises means for adjusting a distance between two respective vertical planes of the two double-belt conveyors.

7. The module of claim 1, wherein the at least one double-belt conveyor comprises first and second sets of rollers mounted on dedicated jacks arranged vertically and distributed over a length of transport of the at least one double-belt conveyor, the first set of rollers guiding a low belt of the high and low belts of the at least one double-belt conveyor and the second set of rollers guiding a high belt of the high and low belts of the at least one double-belt conveyor.

8. The module of claim 7, wherein adjustable and different pressures are applied to the high and low belts by the dedicated vertical jacks at a level of the horizontal pinching plane of the at least one double-belt conveyor, a pressure applied to the low belt supporting a weight of the folding packages being greater than a pressure applied to the high belt.

9. A folding package production line comprising a folding-gluing machine, a counting-segmentation module, a turnover module, and a set of conveyors, wherein the turnover module is a module as claimed in claim 1 for turning over folding packages.

* * * * *